April 8, 1930.  W. KLINGENBERG  1,753,893
SPACE COVERING STRUCTURE, SUCH AS ROOFS, WALLS, AND THE LIKE
Filed Aug. 2, 1927
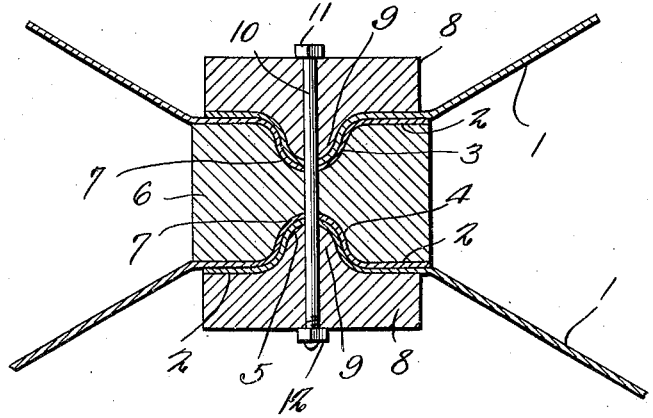
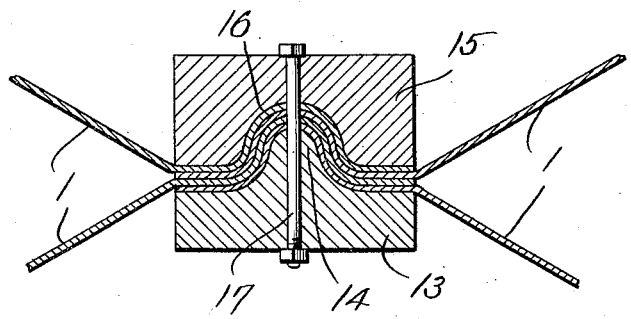
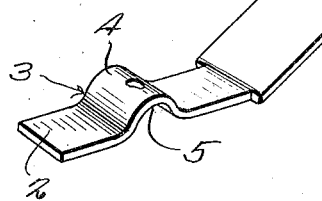
Inventor
William Klingenberg
By J. W. Garner
Attorney Patented Apr. 8, 1930

1,753,893

UNITED STATES PATENT OFFICE

WILHELM KLINGENBERG, OF NEW YORK, N. Y., ASSIGNOR TO LAMELLA ROOF SYNDICATE, INC., OF NEW YORK, N. Y.

SPACE-COVERING STRUCTURE, SUCH AS ROOFS, WALLS, AND THE LIKE

Application filed August 2, 1927. Serial No. 210,170.

This invention relates to improvements in means for securing together the ends of lamellas such as used in space covering structures such as roofs, walls and the like as described in Letters Patent of the United States No. 1,483,037 granted to Friedrich Zollinger February 5, 1924, and in my copending application for Letters Patent of the United States Serial Number 182,132, filed April 8, 1927, the object of the present invention being to effect improvements in the construction of the lamellas and to also provide improved bearing blocks for use in connection with the lamellas to secure the ends of the reticularly related lamellas together and to facilitate the construction of roofs, walls and the like so that they may be readily erected in a very short space of time and to also reduce the cost of such structures and to enable them also to be readily disassembled when this is desired.

With the above and other objects in view, the invention consists in the construction, combination and arrangement of devices hereinafter described and claimed.

In the accompanying drawings

Figure 1 is a plan of a joint between four reticularly related lamellas as constructed in accordance with my invention.

Figure 2 is a similar view showing a modification in the construction of such joint.

Figure 3 is a detail perspective view of one of the lamellas.

The lamellas or units 1 are each, in accordance with my invention, made of iron or steel and are generally as described in my copending application hereinbefore referred to. In accordance with my present improvements, each lamella 1 has each extended end 2 provided at a point intermediate the ends of such extended portion with a transverse substantially semi-circular or V-shaped bend, corrugation, or crimp 3 providing on the one side a correspondingly shaped projection or offset 4 and in the opposite side providing a correspondingly shaped groove, notch, recess or inset 5. The extended ends of each pair of lamellas are arranged in overlapping relation with the projection or tongue 4 of each lamella and arranged in the groove or notch 5 of the associated lamella, and where two pairs of lamellas are to be joined at their overlapping ends as in Figure 1, I also provide an inner bearing block 6, made of iron or steel, which is arranged between the ends of the two lamellas which are innermost and are provided with transverse grooves or notches 7 into which the projections 4 of such lamella ends are inserted.

I also provide a pair of outer bearing blocks 8, each of which is provided on one side, the inner side, with a projection or tongue 9, said projections or tongues being fitted in the grooves or notches 5 of the lamella ends which are outermost and I also provide a bolt 10 which is relatively of slight diameter and is cheaply produced, and arrange said bolt in openings with which the lamella ends and the inner and outer bearing blocks are provided, each bolt having a head 11 and a nut 12. By tightening the nut, the overlapping lamella ends are very securely gripped together and they are also very securely gripped between the inner and outer bearing blocks so that the joint between the lamellas is exceedingly secure and strong as will be understood, since no lamella can get out of alignment with the associated lamella because of their intergripping tongue or projection and groove or notch, and the two pairs of lamellas are held very strongly together by the compressing action of the inner and outer bearing blocks and the intergripping tongues and grooves of the lamellas and the bearing blocks. The lamella ends and the bearing blocks are held in exceedingly strong and secure intergripping relation by the bolts without the necessity of subjecting the bolt to more than very moderate tensile stress, as the bearing stresses are entirely taken up by the notches and projections or tongues of the lamellas and the blocks, as will be understood. The lamellas may usually be made of sheet steel and the lamellas and the bearing blocks may be provided with the necessary openings for the reception of the bolt at very slight cost so that the cost of a structure composed of my lamella units as described in my said copending application for Letters Patent, may be minimized.

In the modified form of the invention shown in Figure 2, I dispense with the inner block and arrange the ends of all four of the lamellas in direct contact and overlapping relation with the projections of three of them engaged in the notches or grooves of each of one of the others, and I also provide two bearing blocks for arrangement on opposite sides of the joint between the lamella ends, the block 13 being formed with a projection or tongue 14 on its inner side for engagement in the groove of the lamella end with which said block is in contact, and the block 15 being provided on its inner side with a groove 16 for the reception of the tongue or projection formed by the joint portion of the lamella and with which said block is in contact, a securing bolt 17 being provided for securing the bearing block and the overlapping lamella ends together.

While I have herein shown and described preferred forms of my invention, I would have it understood that other modifications may be made in the form, proportion and construction of the several parts within the scope of the appended claims.

Having thus described my invention, what I claim is:

1. A structure joint comprising lamellas arranged in overlapping relation and each having a transverse substantially semi-circular corrugation forming an offset on one side and a corresponding inset on the opposite side, said lamellas being arranged in pairs, the offset of one lamella of each pair being of different diameter than and engaged in the corresponding inset of the other lamella of said pair so that the corrugations of said pair of lamellas are concentric, bearing blocks arranged one between the two pairs of lamellas and the others being arranged on the outermost lamella of each pair of lamellas, said bearing blocks being shaped to fit each against the opposing surface of the contacting lamella and a bolt extending through said bearing blocks and the corrugations of said lamellas and securing them together, the said bearing blocks and lamellas by reason of the offsets and insets with which they are provided sustaining bearing stresses and said bolt being subjected only to moderate tensile stress and being substantially relieved of bearing stress.

2. A pair of lamellas arranged in overlapping relation and each having a transverse, substantially semi-circular corrugation forming an inset on one side and an offset on the opposite side, the corrugation of each lamella being of different diameter than and engaged with that of the other so that the corrugations of said pair of lamellas are concentric and means securing said lamellas together at their point of contact, said securing means comprising blocks arranged in opposing relation and shaped on their opposing faces to fit the corrugations of the lamellas and a bolt extending through said bearing blocks and the corrugations of said lamellas and securing them together.

In witness whereof I affix my signature.

WILHELM KLINGENBERG.